United States Patent [19]

Mayhew et al.

[11] 4,079,901
[45] Mar. 21, 1978

[54] LAUNCHING APPARATUS FOR FLYING DEVICE

[75] Inventors: Harry E. Mayhew; William J. Nissley, both of Wilmington, Del.; Leonard R. Widdekind, Landenberg, Pa.

[73] Assignee: All American Industries, Inc., Thomaston, Conn.

[21] Appl. No.: 674,440

[22] Filed: Apr. 7, 1976

[51] Int. Cl.² ............................................. B64F 1/06
[52] U.S. Cl. ...................................... 244/63; 124/36; 124/61
[58] Field of Search ................... 244/63; 46/74 B, 81; 124/31, 34, 35, 36, 56 R, 61

[56] References Cited

U.S. PATENT DOCUMENTS

| | | | |
|---|---|---|---|
| 1,317,631 | 9/1919 | Kinser | 244/63 |
| 1,388,361 | 8/1921 | Mesurier | 244/63 |
| 1,535,475 | 4/1925 | Jeansen et al. | 244/63 |
| 1,777,167 | 9/1930 | Forbes | 244/63 |
| 1,797,514 | 3/1931 | Richter | 244/63 |
| 1,960,264 | 5/1934 | Heinkel | 244/63 |
| 2,415,071 | 2/1947 | Brie | 244/63 |
| 2,969,942 | 1/1961 | Scheuerman | 244/63 |
| 3,968,947 | 7/1976 | Schlegel et al. | 244/63 |

FOREIGN PATENT DOCUMENTS

| | | | |
|---|---|---|---|
| 355,432 | 1/1938 | Italy | 244/63 |
| 348,844 | 5/1930 | United Kingdom | 244/63 |

*Primary Examiner*—Galen L. Barefoot
*Attorney, Agent, or Firm*—Connolly and Hutz

[57] ABSTRACT

The shuttle for launching an RPV is connected to a launching tube by a motion and high speed-multiplying pulley and cable assembly. The telescopic launching tube assembly is connected between and parallel to a pair of elongated arms of a sealed U-shaped tubular assembly connected by a manifold to which the telescopic tube and shuttle are latched back against the force of compressed air stored in the U-shaped receiver. The release of the latch is damped to minimize acceleration forces on the launched RPV. The receiver and launching tubes are mounted on an elongated base whose rear end is rotatably connected to an anchor plate and the front end of the tubular assembly is adjustably mounted upon the front of the base on an adjustable jack support.

13 Claims, 10 Drawing Figures

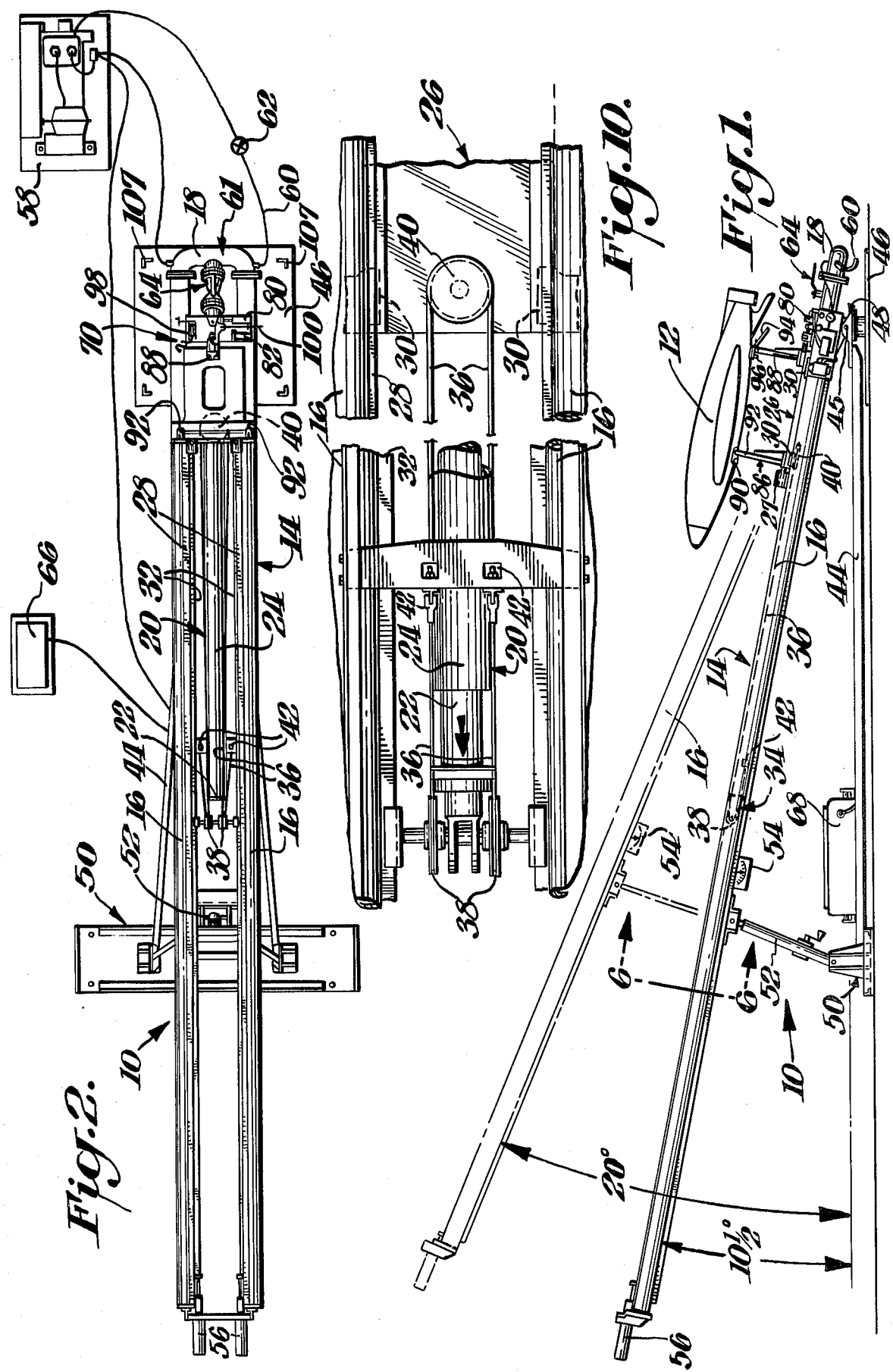

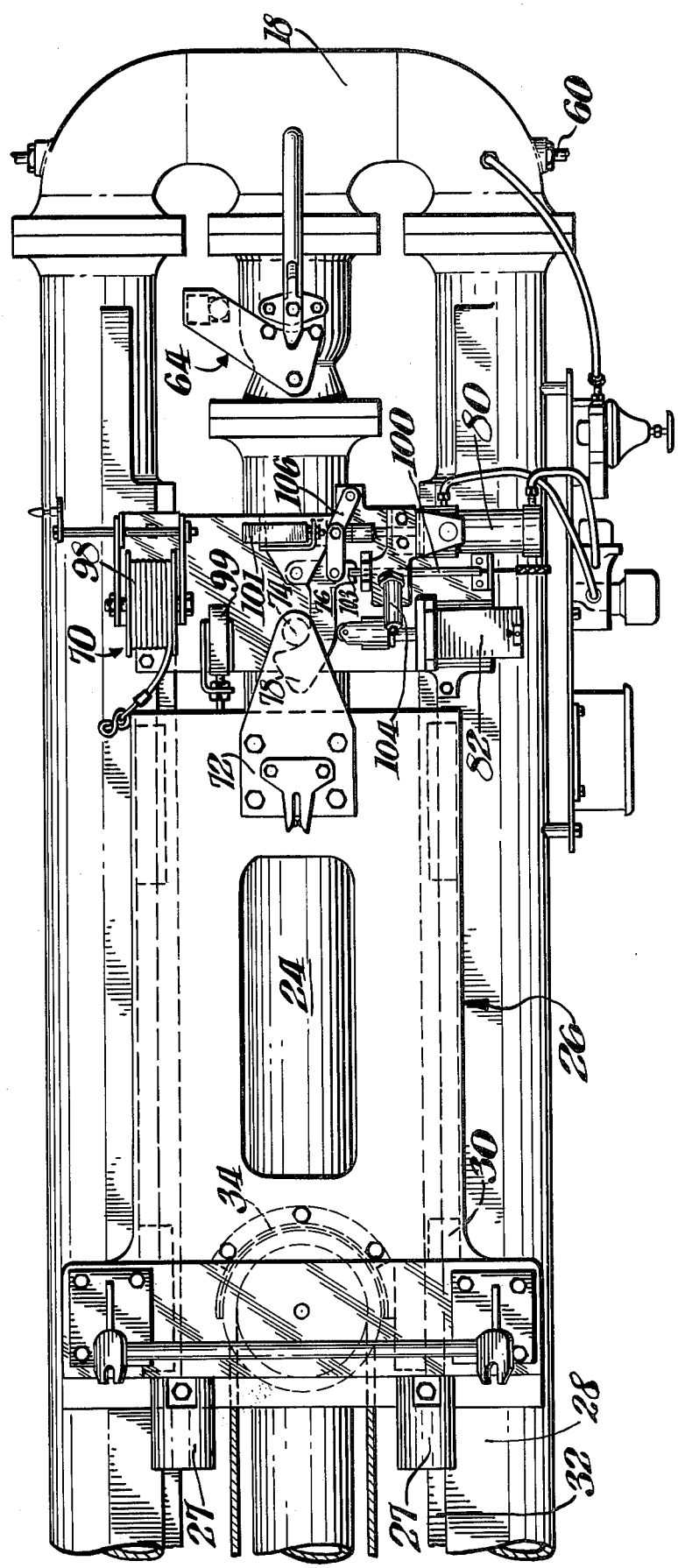

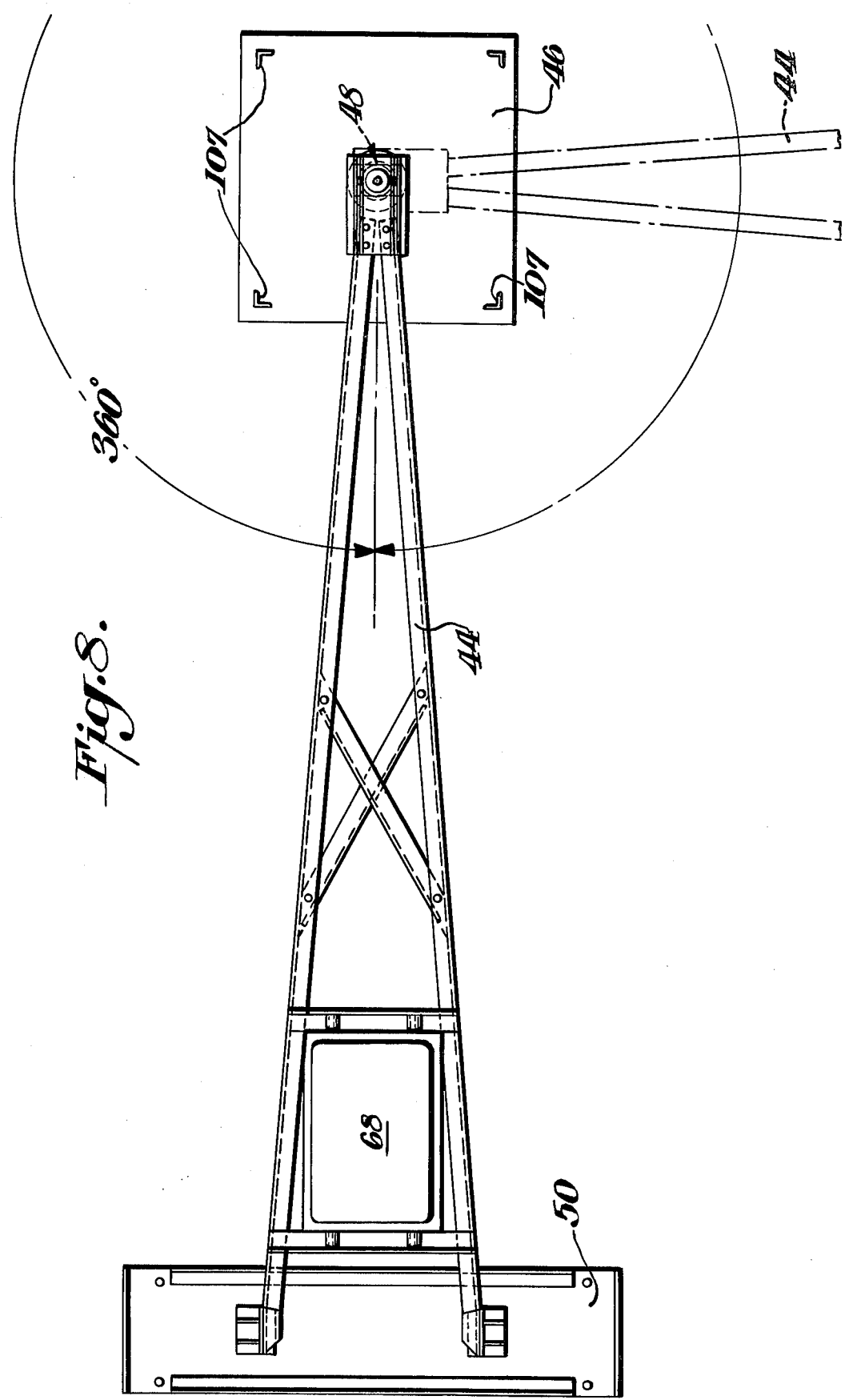

LAUNCHING APPARATUS FOR FLYING DEVICE

BACKGROUND OF THE INVENTION

Copending commonly assigned U.S. patent application Ser. No. 540,864, filed Jan. 14, 1975, now U.S. Pat. No. 3,968,947 relates to a launching apparatus for remote piloted vehicle (RPV) in which compressed air stored in a receiver expands to extend a telescopic tube assembly for launching the RPV when a latch holding the telescopic tube assembly back is released. It is important to make such launching apparatus as simple and dependable as possible and to facilitate its transportation and deployment in the field. An object of this invention is, therefore, to simplify the structure of such compressed air operated launching apparatus and to make its operation and deployment rapid, convenient, dependable and efficient.

SUMMARY

In accordance with this invention the apparatus comprises a sealed U-shaped tubular assembly having a pair of elongated arms joined by a short manifold. The open rear end of the launching telescopic tube assembly is connected to the manifold and the compressed air stored within the U-shaped tubular assembly. A shuttle connected to the launching tube supports the RPV on a bracket and propels it into the air. The launching tube and shuttle are restrained against the force of the compressed air stored in the U-shaped receiver by a latch whose release may be retarded to minimize acceleration forces on the launched flying device. The arms may comprise tubular extrusions incorporating protruding rails for guiding the launching movement of the shuttle and the launching tube. The shuttle may be connected to the launching tube by a motion-and-speed-multiplying pulley and cable assembly. Transportation and deployment are facilitated by mounting the manifold on a simple base having a rotatable anchor plate at its rear and a sliding skid under its front end. A jack support extendably supports the free ends of the U-shaped receiver over the front of the base for varying its elevation.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention with an RPV mounted on it ready for launching;

FIG. 2 is a top plan view of the embodiment shown in FIG. 1 with the RPV removed;

FIG. 3 is an enlarged top plan view of the rear manifold end of the apparatus shown in FIGS. 1 and 2 in the latched-back condition;

FIG. 8 is a top plan view of the base of the launching apparatus shown in FIGS. 1-7;

FIG. 10 is a diagrammatic plan view of the telescopic tube assembly and reeved cable arrangement of the embodiment shown in FIGS. 1-9.

DESCRIPTION OF THE PREFERRED EMBODIMENT

Figure 4:
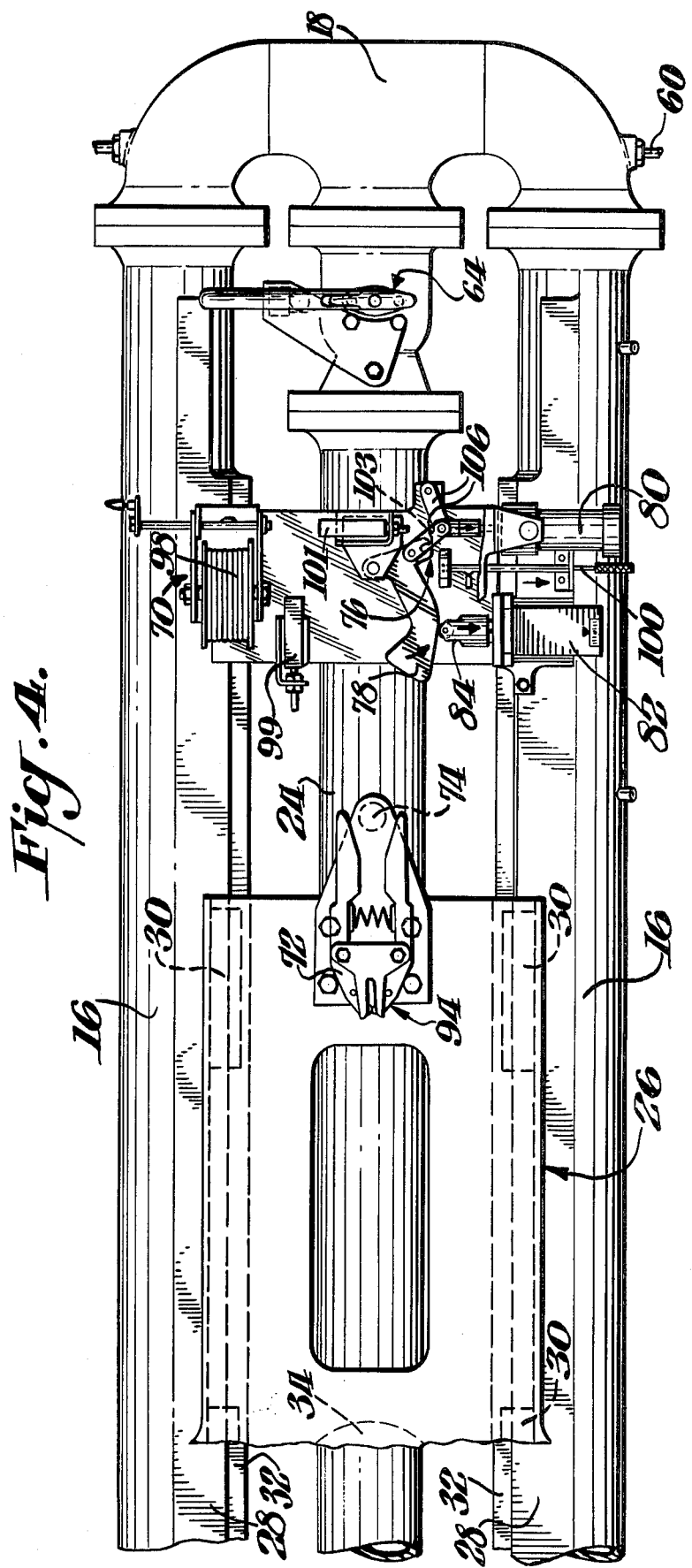
FIG. 4 is an enlarged plan view similar to FIG. 3. in an unlatched position.

In FIGS. 1 and 2 is shown apparatus 10 for launching a flying device 12, such as a remote piloted vehicle (RPV) smaller than a piloted aircraft. Apparatus 10 includes a U-shaped tubular assembly including a pair of elongated tubular arms 16, about 20 feet long joined at their rear-ends by a short manifold 18. Tubular arms 16 are, for example, aluminum alloy extrusions and manifold 18 is also, for example, fabricated or cast from an aluminum alloy. Telescopic tube assembly 20 is connected to the center of manifold 18 and is disposed substantially equidistantly between arms 16 and parallel to them. The front of telescopic tube assembly 20 constitutes launching tube 22, which slides back and forth within rear tube 24 and is sealed within the front end of rear tube 24, by, for example, cup seals (not shown).

Shuttle plate 26 is mounted to slide on protruding upper rails 28 disposed on the inner surfaces of tubular arms 16 by shoes 30. Rails 28 are conveniently fabricated on tubular arms 16 by forming tubular arms 16 as aluminum extrusions with protruding rails 28 on upper inner portions thereof and lower protruding rails 32 projecting from lower inner portions thereof. See FIGS. 2, 4 and 6.

Figure 7:
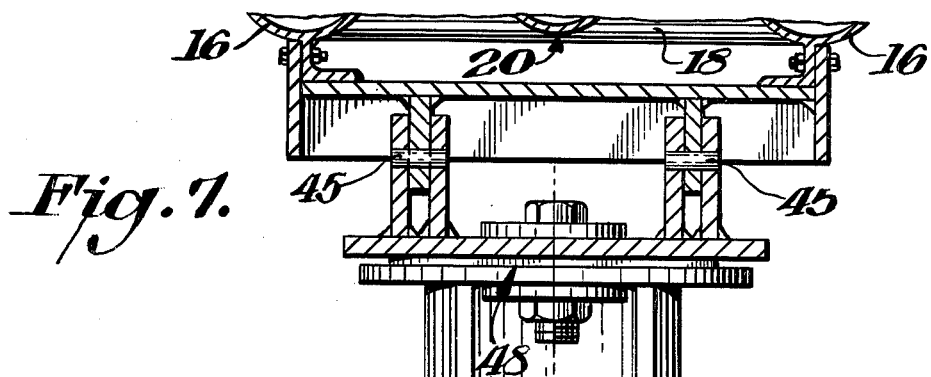
FIG. 7 is a cross-sectional view taken through FIG. 5 along the line 7—7.

Shuttle 26 is connected to launching tube 22 by reeved pulley and cable assembly 34 having cables 36 double reeved about pulleys 38 at the front of launching tube 22, about single horizontal pulley 40 under shuttle 26 and anchored to U-shaped tube assembly 14 by connections 42. This double reeving doubles the distance travelled and the speed of shuttle 26 relative to launching tube 22. Such pulley and cable arrangements are described in U.S. Pat. Nos. 1,388,361 and 1,797,514. The rear of tubular assembly 14 is rotatably connected to elongated triangular base frame 44 by lateral bearings 45 and the rear end of base frame 44 is rotatably secured to anchor plate 46 by bearing 48, as shown in FIG. 7. The front end of tubular assembly 14 is connected to the front skid 50 of base frame 44 by adjustable jack assembly 52, which varies the angular elevation of tube assemblies 14 and 20 above the horizontal, for example, between about 10° and 20°. The adjusted angle is indicated on inclinometer 54 attached to the side of tube assembly 14.

The forward movement of shuttle 26 is arrested when bumpers 27 on shuttle plate 26 engage shock absorbers 56 at the ends of elongated arms 16. Shock absorbers 56, are, for example, combined pressurized air and oil-filled piston and cylinder assemblies, which provide a substantially constant resistance over their entire stroke. This type of action is provided by incorporating a number of small orifices in the shock absorbers, which are reduced near the end of travel of the pistons to equalize the resisting force over their range of travel.

Compressed air is supplied to the receiver components 61 constituted by hollow spaces in U-shaped tube assembly 14 and the hollow space in telescopic tube assembly 20, from compressor 58 connected by tubular conduit 60 to manifold 18. After charging the receiver 61, conduit 60 is sealed off from it by valve 62. Telescopic tube assembly 20 may be sealed off from U-shaped tubular assembly 14 by a large ball valve 64, which has substantially full cross-sectional flow area when opened to prevent throttling of the compressed air which flows into telescopic tube assembly 20 from manifold 18. Control panel 66 is connected to power supply 68 mounted on the front end of base 44 and to launch control system 70 on telescopic tube assembly 20.

FIGS. 3 and 4 show details of control system 70 in latched and unlatched positions, respectively. Control system 70 includes a latching lug 72 on the rear of shuttle 26, whose anchoring pin 74 is engaged by latching linkage 76, namely by latching hook 78. Latching hook 78 and linkage 76 are operated by pneumatic cylinder and piston unit 80 to release hook 78 from latching pin 74 to initiate a launch. Damping device 82 has a buffer 84 in contact with latch hook 78, which retards the opening movement of hook 78 to retard the rate of onset of the latch release. This controls the acceleration of shuttle 26 and RPV 12 so that the acceleration of RPV 12 does not exceed 400G/sec. in other words 12 G. in 0.03 seconds.

Figure 5:
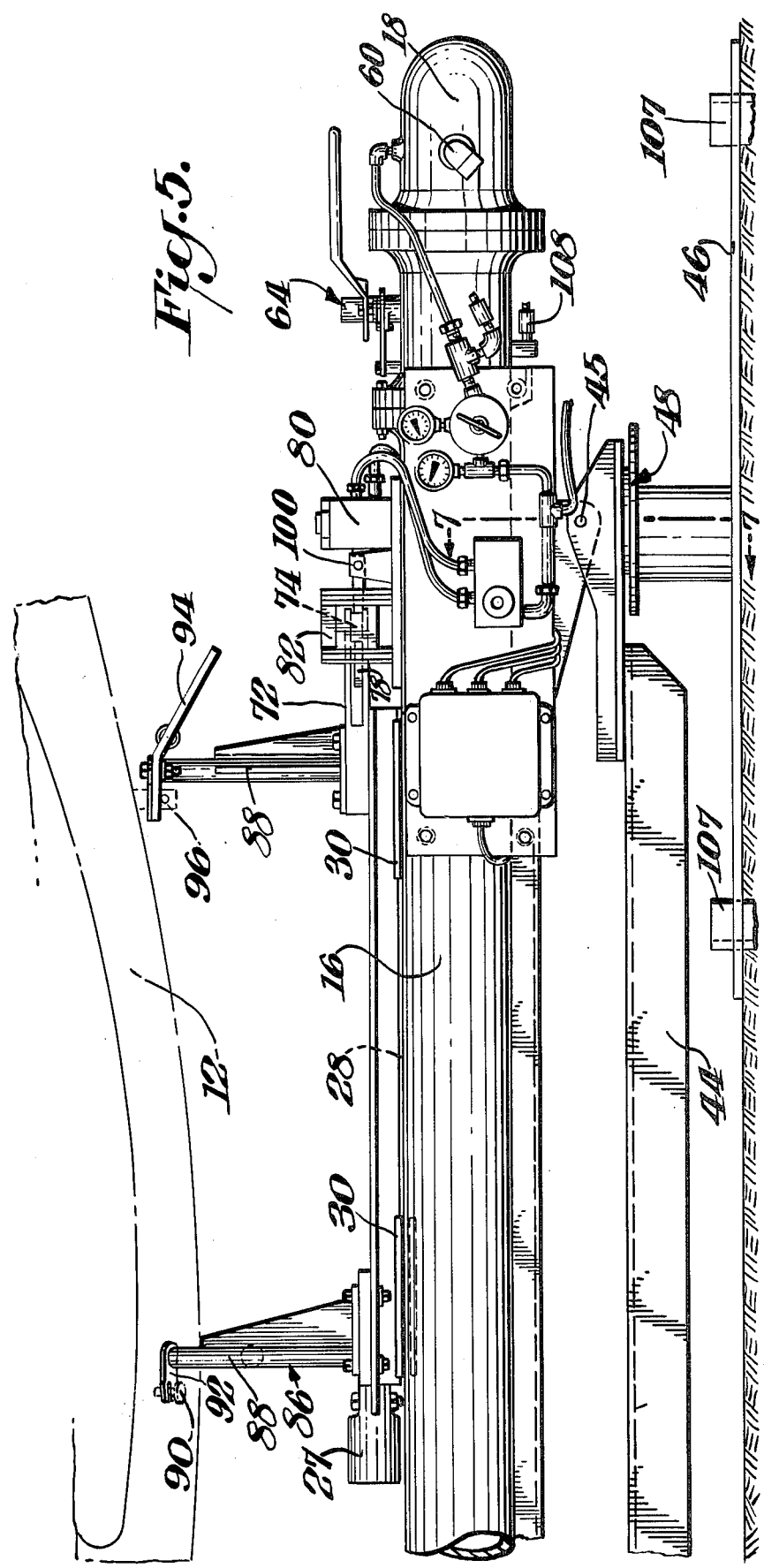
FIG. 5 is a side view in elevation of the manifold portion of the apparatus shown in FIGS. 1-4 with an RPV mounted upon it ready for launching.

RPV 12 is mounted on shuttle 26 upon launching bracket 86 which supports the RPV on three vertical struts 88. The front two struts 88 engage pins 90 under the front sides of RPV 12 in open slotted pads 92 shown in FIG. 5. Spring tong holder 94 on rear strut 88 engages rear T-shaped pin 96 under the tail of RPV 12. RPV 12 is thus releasably held on shuttle 26 (prior to launching) against the forward force of its propulsion motor. After shuttle 26 has moved forward through its launching stroke and is arrested by shock absorbers 56, it is retrieved back to its launching position by manual winch 98, shown in FIG. 4. Microswitches 99 and 101 shown in FIG. 4 detect the shuttle 26 position and latching linkage 76 position respectively providing safety interlocks for the control system 70.

Figure 6:
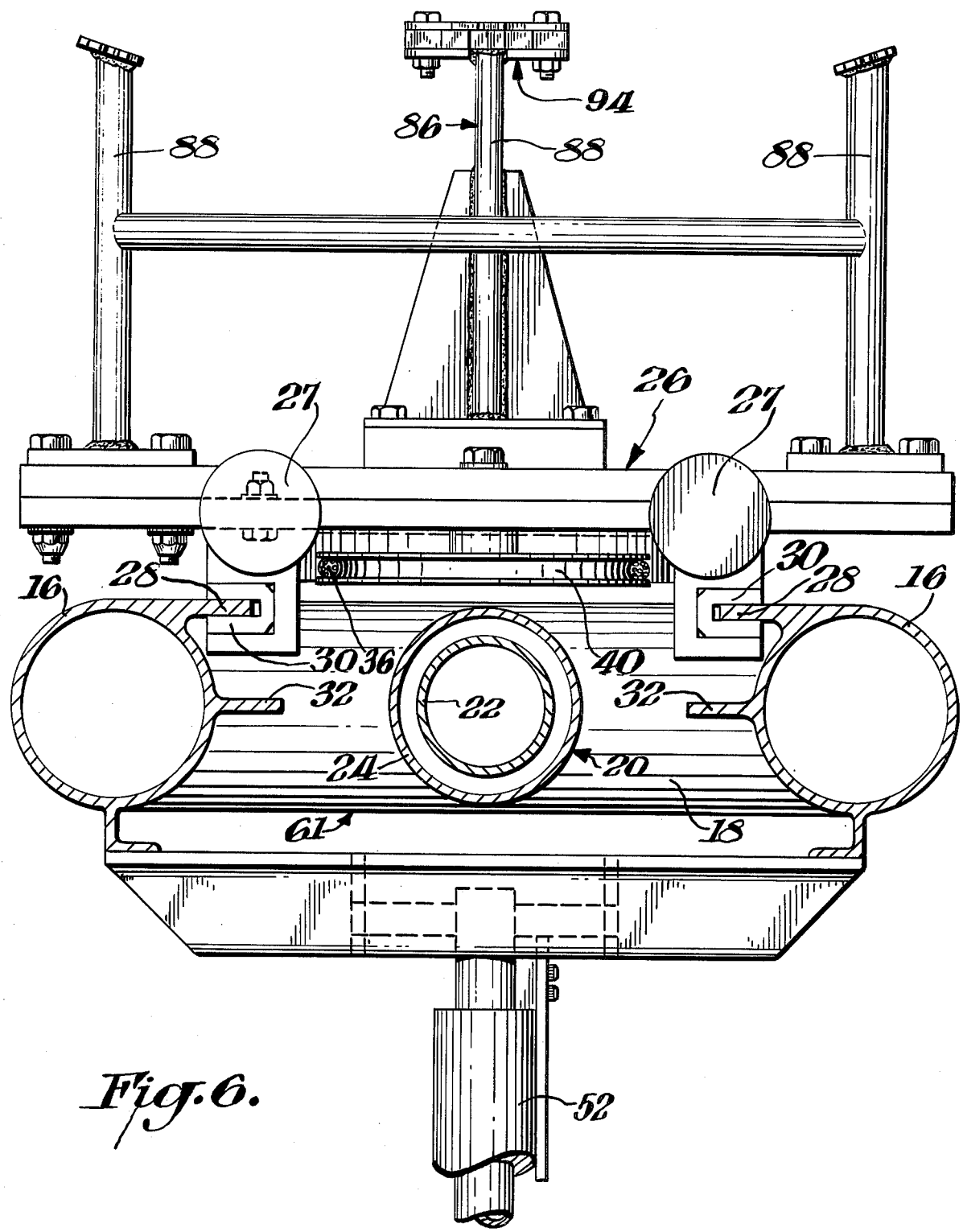
FIG. 6 is a cross-sectional view taken through FIG. 1 along the line 6—6.

FIG. 6 shows sliding shoes 30 under shuttle 26 engaging upper rails 28 on tubular arms 16. Sliding shoes 30 are, for example, made of a graphite-impregnated phenolic plastic material, which is further lubricated by dry molybdenum disulfide powder, which is for example packed in a spray can under the trademark MOLYKOTE by Corning Glass Co. Lower shoes 102 are connected to the front end of launching tube 22 and ride on lower rails 32 inside tubular arm 16 and are also made of a self-lubricating material, such as Teflon, because it does not move as fast as upper shoes 30. TEFLON[R] is the trademark of E. I. DuPont De Nemours Co. of Wilmington, Delaware for a fluorinated ethylene-propylene resin.

OPERATION

The receiver 61 constituted of the U-shaped tubular assembly 14 and telescopic launching tube 20 is, for example, initially charged to about 500 PSI. When the receiver 61 is charged, valve 64 is opened to allow for the charge force to bear on launching piston tube 20.

Manual safety latch pin 100 is removed from locking engagement with detent slot 103 in latching hook 78. This unlatched position of latch pin 100 is sensed by interlock microswitch 104 that causes the firing circuit to be safely opened. Piston cylinder 80 is activated causing scissor links 106 to pull latching linkage away from anchor pin 74 on shuttle 26 which carries RPV forward at an accelerating speed to the ends of tubular arms 16 where the carriage is arrested by shock absorbers 56. Hydraulic shock absorber 82 restricts rapid unlatch. The RPV surges forward free of arrested shuttle 26 and flies off of supporting struts 88. Safety valve 64 is closed and pressurized telescopic tube assembly 20 is vented through solenoid vent valve 108. Approximately 12 to 15 minutes is required after launching to pull shuttle 26 back to its launching position by hand operated winch 98.

Launcher 10 is accordingly a low pressure linear pneumatic catapult, which uses a short stroke cable drive to accelerate launching shuttle 26 to the required airspeed of its RPV payload. The system concepts low pressure, linear pneumatic, reeved cable drive — provide LP launcher 10 with reliability, low maintenance, long service life and low cost per launch operation. LP launcher 10 can be designed for a wide range of launch strokes. The stroke length, and therefore, the model number, is determined by the requirements of the user's particular RPV's.

Launcher 10 is, for example, capable of launching mini-RPV's weighing up to 300 pounds at speeds to 70 knots. It is produced with a universal mounting designed for a variety of installations. It can be mounted on a trailer, on a truck, the deck of a ship, on a prepared foundation or directly on the ground. Angle stakes 107 removably fasten anchor plate 46 and launcher 10 to the ground.

Figure 9:
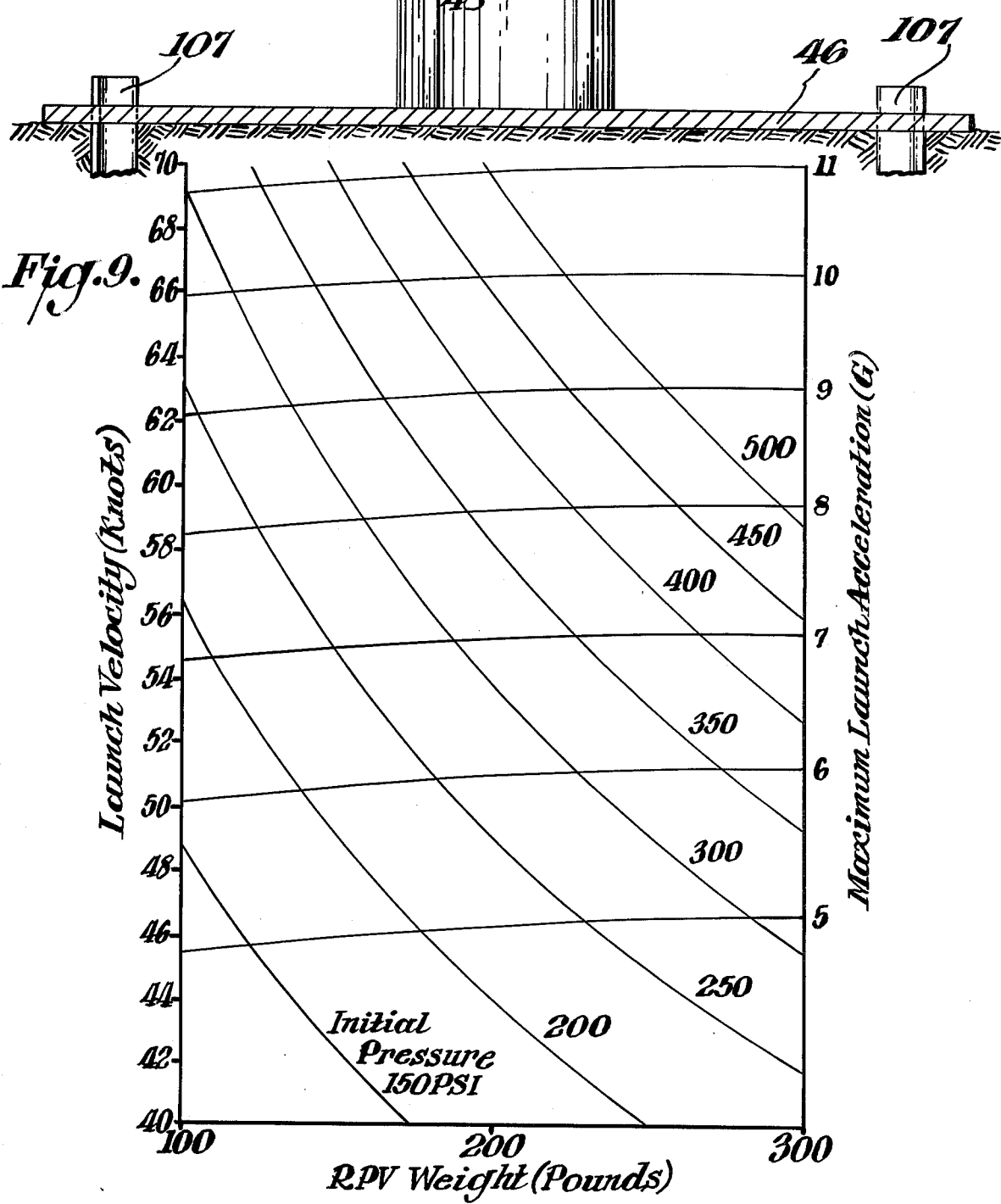
FIG. 9 is a performance curve showing launch velocity in knots and maximum launch acceleration in G's as ordinates and RPV weight in pounds as the abscissa.

FIG. 9 shows examples of launch velocity in knots vs. RPV weight (pounds) for different initial pressures in psi for a range of embodiments of this invention. It also indicates the maximum launch acceleration (G) for different RPV weights and initial launching pressures. An RPV weighing 200 pounds launched at an initial pressure of 400 psi will, for example, have a launching velocity of about 62 knots at a maximum acceleration of 9G. An RPV of 100 pounds launched at an initial launching pressure of 250 psi will, for example, have an initial velocity of 63 knots at a maximum acceleration of about 9.3G. The launch velocity and maximum acceleration of other combinations of RPV weight up to 300 pounds and initial launching pressures up to 500 psi can be readily obtained from FIG. 9.

Other applications of apparatus 10 are, for example:
(1) Launching of unmanned powered and unpowered lightweight aircraft not capable of taking off on a runway, e.g. aircraft having no landing gear.
(2) Launching of self-propelled weapons from confined areas, e.g., "zero length" concept.
(3) Controlled acceleration of objects and vehicles for test purposes.
(4) Rapid erection of structures and members, e.g. railway crossing barriers, aircraft-arresting nets and/or stanchions therefore.

We claim:
1. A launching apparatus for a flying device comprising a sealed elongated U-shaped tubular assembly having a pair of elongated substantially parallel arms joined to each other at one end by a short manifold, a telescopic tube assembly having a closed launching tube at its front end and an open rear end, the open rear end of the telescopic tube assembly being connected to the center of the manifold between the elongated arms whereby the telescopic tube assembly is disposed substantially equidistantly between and parallel to the arms, a source of compressed air connected to the tubu- lar assembly whereby it and the telescopic tube assembly are constituted as a receiver of pressurized fluid for extending the telescopic tube assembly, latching means holding the telescopic tube assembly retracted adjacent the manifold against the force of the pressurized fluid in the receiver, a shuttle connected to be propelled following the launching tube, bracket means on the shuttle for mounting the flying device on the shuttle, latch release means connected to the latching means for releasing the launching tube for movement followed in a launching stroke in response to the expansion of the pressurized fluid whereby the flying device is rapidly propelled toward and past the front end of the apparatus to launch the flying device into the air, the receiver being sufficiently large to provide a full launching stroke of the telescopic tube assembly when the pressurized fluid is allowed to expand, the latch release means being actuated after the receiver is charged with the pressurized fluid for initiating the launching stroke of the telescopic tube assembly, upper and lower rails are mounted on inner surfaces of the arms of the U-shaped tubular assembly, the shuttle and the telescopic tube assembly are slidably engaged with the upper and lower rails, control means is provided for actuating the latch release means, motion-damping means is disposed in the path of movement of the control means, whereby the acceleration of the launching tube is retarded, the U-shaped tubular assembly is mounted on a base frame, an anchor plate, and the rear of the base frame is rotatably mounted about vertical and horizontal axes on the anchor plate whereby an angular orientation and elevation of the apparatus may be varied.

2. A launching apparatus for a flying device comprising a sealed elongated U-shaped tubular assembly having a pair of elongated substantially parallel arms joined to each other at one end by a short manifold, a telescopic tube assembly having a closed launching tube at its front end and an open rear end, the open rear end of the telescopic tube assembly being connected to the center of the manifold between the elongated arms whereby the telescopic tube assembly is disposed substantially equidistantly between and parallel to the arms, a source of compressed air connected to the tubular assembly whereby it and the telescopic tube assembly are constituted as a receiver of pressurized fluid for extending the telescopic tube assembly, latching means holding the telescopic tube assembly retracted adjacent the manifold against the force of the pressurized fluid in the receiver, a shuttle connected to be propelled following the launching tube, bracket means on the shuttle for mounting the flying device on the shuttle, latch release means connected to the latching means for releasing the launching tube for movement followed in a launching stroke in response to the expansion of the pressurized fluid whereby the flying device is rapidly propelled toward and past the front end of the apparatus to launch the flying device into the air, the receiver being sufficiently large to provide a full launching stroke of the telescopic tube assembly when the pressurized fluid is allowed to expand, the latch release means being acutated after the receiver is charged with the pressurized fluid for initiating the launching stroke of the telescopic tube assembly, upper and lower rails are mounted on inner surfaces of the arms of the U-shaped tubular assembly, the shuttle and the telescopic tube assembly are respectively slidably engaged with the upper and lower rails a motion-multiplying and speed increasing cable and pulley assembly connecting the launching tube to the shuttle whereby the shuttle is moved through a greater distance than the launching tube and at a higher rate of speed to facilitate launching of the flying device, the cable and pulley assembly including a pair of pulleys mounted one each alongside the front end of the launching tube, a centering pulley sheave on the shuttle, and a cable having its end connected to the U-shaped tubular assembly and from there extending around the pulleys at the front end of the launching tube and having its midportion reeved around the centering pulley sheave.

3. An apparatus as set forth in claim 2 wherein the arms are extrusions which incorporate the rails.

4. An apparatus as set forth in claim 3 wherein shock-absorbing means is disposed on the ends of the arms in the path of movement of the shuttle, and the shock-absorbing means being constructed and arranged for terminating the launching movement of the shuttle and launching tube.

5. An apparatus as set forth in claim 2 wherein a ball valve connects the rear end of the telescopic tube assembly to the manifold for optionally sealing the U-shaped tubular assembly from the telescopic tube assembly.

6. A launching apparatus as set forth in claim 2, wherein the centering sheave has a substantially vertical axis of rotation.

7. A launching apparatus as set forth in claim 2, including a base frame, horizontal axis pivot means mounting the manifold end of the U-shaped tubular assembly on the base frame, an anchor plate, and the rear of the base frame is rotatably mounted about a vertical axis to the anchor plate whereby an angular orientation and elevation of the apparatus may be varied.

8. An apparatus as set forth in claim 7 wherein an elevating support is adjustably connected to the front end of the telescopic tube assembly for conveniently varying its elevation.

9. An apparatus as set forth in claim 8 wherein the front end of the base frame includes a skid for facilitating a change in angular orientation of the apparatus in the horizontal plane.

10. An apparatus as set forth in claim 9 wherein an the elevating support connects the free end of the arms to the front of the base frame.

11. An apparatus as set forth in claim 10 wherein the elevating support is constructed and arranged to provide an angle of the tube assembly above horizontal from about 10° to 20°.

12. A launching apparatus for a flying device comprising a sealed elongated U-shaped tubular assembly having a pair of elongated substantially parallel arms joined to each other at one end by a short mannifold, a telescopic tube assembly having a closed launching tube at its front end and an open rear end, the open rear end of the telescopic tube assembly being connected to the center of the manifold between the elongated arms whereby the telescopic tube assembly is disposed substantially equidistantly between and parallel to the arms, a source of compressed air connected to the tubular assembly whereby it and the telescopic tube assembly are constituted as a receiver of pressurized fluid for extending the telescopic tube assembly, latching means holding the telescopic tube assembly retracted adjacent the manifold against the force of the pressurized fluid in the receiver, a shuttle connected to be propelled following the launching tube, bracket means on the shuttle for mounting the flying device on the shuttle, latch release means connected to the latching means for releasing the launching tube for movement followed in a launching stroke in response to the expansion of the pressurized fluid whereby the flying device is rapidly propelled toward and past the front end of the apparatus to launch the flying device into the air, the receiver being sufficiently large to provide a full launching stroke of the telescopic tube assembly when the pressurized fluid is allowed to expand, the latch release means being actuated after the receiver is charged with the pressurized fluid for initiating the launching stroke of the telescopic tube assembly, control means is provided for actuating the latch release means, and motion-damping means is disposed in the path of movement of the control means, whereby the acceleration of the launching tube is retarded.

13. An apparatus as set forth in claim 12 wherein the motion-damping means is constructed and arranged to prevent the acceleration in the launching tube from exceeding about 400 G./sec.

* * * * *